US011601004B2

(12) United States Patent
Nook et al.

(10) Patent No.: US 11,601,004 B2
(45) Date of Patent: Mar. 7, 2023

(54) BATTERY ASSEMBLY DEVICE (71) Applicant: The NOCO COmpany, Glenwillow, OH (US)

(72) Inventors: Jonathan Lewis Nook, Gates Mills, OH (US); William Knight Nook, Sr., Shaker Heights, OH (US); James Richard Stanfield, Peoria, AZ (US); Derek Michael Underhill, Chandler, AZ (US)

(73) Assignee: The NOCO Company, Glenwillow, OH (US)

( * ) Notice: Subject to any disclaimer, the term of this patent is extended or adjusted under 35 U.S.C. 154(b) by 0 days.

(21) Appl. No.: 15/137,626

(22) PCT Filed: Mar. 29, 2016

(86) PCT No.: PCT/US2016/024680
§ 371 (c)(1),
(2) Date: Apr. 25, 2016

(87) PCT Pub. No.: WO2017/138963
PCT Pub. Date: Aug. 17, 2017

(65) Prior Publication Data
US 2018/0342891 A1    Nov. 29, 2018

Related U.S. Application Data

(60) Provisional application No. 62/294,067, filed on Feb. 11, 2016.

(51) Int. Cl.
*H02J 7/14* (2006.01)
*H01M 50/543* (2021.01)
(Continued)

(52) U.S. Cl.
CPC ............. *H02J 7/14* (2013.01); *H01M 50/553* (2021.01); *H01M 50/566* (2021.01); *H01R 11/24* (2013.01); *H02J 1/122* (2020.01)

(58) Field of Classification Search
CPC ....................................................... H02J 7/342
See application file for complete search history.

(56) References Cited

U.S. PATENT DOCUMENTS 4,972,135 A    11/1990  Bates et al.
4,990,723 A *  2/1991   Ziberna ............... A47J 37/0745
                                                          174/152 R
(Continued)

FOREIGN PATENT DOCUMENTS

CN    104617250 A     5/2015
DE    102010062708    6/2012
(Continued)

OTHER PUBLICATIONS

Canadian Patent Office, Examination Report, Application No. 3,107,432, dated Oct. 5, 2022.
(Continued)

*Primary Examiner* — Drew A Dunn
*Assistant Examiner* — Tynese V McDaniel
(74) *Attorney, Agent, or Firm* — Jones Day (57) ABSTRACT

A battery assembly device for a battery jump starting device. The battery assembly is configured to maximize electrical conductivity from a battery pack of the battery jump starting device to a battery to be recharged.

32 Claims, 11 Drawing Sheets (51) Int. Cl.
  *H01R 11/24* (2006.01)
  *H02J 1/10* (2006.01)
  *H01M 50/566* (2021.01)
  *H01M 50/553* (2021.01)

(56) References Cited

U.S. PATENT DOCUMENTS

| | | | |
|---|---|---|---|
| 6,002,235 A * | 12/1999 | Clore | H01R 11/24 320/105 |
| 6,130,519 A | 10/2000 | Whiting et al. | |
| 6,215,273 B1 * | 4/2001 | Shy | H01M 2/1022 320/105 |
| 6,222,342 B1 * | 4/2001 | Eggert | H02J 7/0045 307/66 |
| 6,300,742 B1 | 10/2001 | Hung | |
| 6,679,708 B1 | 1/2004 | Depp et al. | |
| 9,007,015 B1 | 4/2015 | Nook et al. | |
| 2004/0130298 A1 | 7/2004 | Krieger et al. | |
| 2005/0213867 A1 * | 9/2005 | Rajendran | G01K 11/32 385/12 |
| 2006/0071631 A1 * | 4/2006 | Cheung | H02J 7/342 320/105 |
| 2006/0244412 A1 | 11/2006 | Bonzer et al. | |
| 2007/0132537 A1 * | 6/2007 | Osbun | H01F 27/2828 29/595 |
| 2010/0001682 A1 | 1/2010 | Dickson et al. | |
| 2011/0117408 A1 * | 5/2011 | Lennox | H01M 2/0277 429/99 |
| 2011/0140651 A1 | 6/2011 | Dai | |
| 2013/0241498 A1 | 9/2013 | Koebler | |
| 2014/0139175 A1 * | 5/2014 | Gonzalez | H01M 2/206 320/101 |
| 2015/0087182 A1 * | 3/2015 | Zhao | H01M 2/206 439/504 |
| 2016/0049819 A1 | 2/2016 | Butler et al. | |
| 2016/0181587 A1 * | 6/2016 | Koebler | H01M 2/34 429/7 |

FOREIGN PATENT DOCUMENTS

| | | | |
|---|---|---|---|
| EP | 2388845 A1 * | 11/2011 | H01M 2/1077 |
| EP | 2388845 B1 | 3/2014 | |
| JP | 2015115979 A | 6/2015 | |
| WO | WO 2012074548 A1 | 6/2012 | |
| WO | WO 2012081140 A1 | 6/2012 | |
| WO | WO 2015195321 A1 | 12/2015 | |

OTHER PUBLICATIONS

Japan Patent Office, Decision of Refusal, Application No. 2020-056227, dated Jul. 26, 2022.
IP Australia, Application No. 2021254622, Examination Report No. 1, dated Oct. 19, 2022.
IP Australia, Application No. 2020200268, Examination Report No. 2, dated Mar. 31, 2021.
Canadian Patent Office, Application No. 3,107,432, Examination Report, dated Jan. 19, 2022.
China Intellectual Property Office, Appl. 201680002479.X, First Office Action, dated Apr. 20, 2020.
China Intellectual Property Office, Appl. 201680002479.X, Second Office Action, dated Feb. 3, 2021.
China Intellectual Property Office, Appl. 201680002479.X, Third Office Action, dated May 18, 2021.
European Patent Office, Application No. 16831887.1, Article 94(3) Communication, dated Sep. 20, 2022.
European Patent Office, Application No. 16831887.1, Extended European Search Report, dated Feb. 26, 2020.
Japan Patent Office, Appl. 2020-056227, First Office Action, dated Apr. 6, 2021.
Japan Patent Office, Appl. 2020-056227, Second Office Action, dated Dec. 14, 2021.
Japan Patent Office, Appl. 2020-056227, Decision of Refusal, dated Jul. 4, 2022.
Patent Cooperation Treaty, PCT/US2016/024680, International Search Report, dated Jun. 24, 2016.
Patent Cooperation Treaty, PCT/US2016/024680, International Preliminary Report on Patentability, dated Aug. 14, 2018.
United Kingdom Patent Office, Combined Search and Examination Report, Application No. GB2018012.1, dated May 3, 2021.

* cited by examiner

BATTERY ASSEMBLY DEVICE

FIELD

A battery assembly device, for example, for use in a battery jump starting device.

BACKGROUND

The exists a portable vehicle battery jump start apparatus as disclosed in U.S. Pat. No. 9,007,015 to Nook et al. The apparatus utilizes a lithium ion battery pack. In this type of apparatus, there exists a need to maximize conductivity from the battery pack of the apparatus to the vehicle battery of the vehicle being jump started.

For successful car jump-starts, there are two main factors dictating the results. The first factor is the amount of power provided by the lithium ion battery pack, and the second factor is the maximum conductivity. You need both factors to have the best chance to jump-start big engines. One factor without the other factor is not enough.

SUMMARY

The subject matter relates to a battery assembly device for use with an apparatus for jump starting a vehicle, and an apparatus for jump starting a vehicle comprising the battery assembly device.

The subject matter relates to the following objects.

A battery assembly device comprising or consisting of a battery having at least one battery conductor connected to a terminal of the battery.

A battery assembly device comprising or consisting of a battery having at least one battery conduct connected to a terminal tab of the battery.

A battery assembly device comprising or consisting of a battery having a positive battery conductor connected to a positive terminal contact of the battery and a negative battery conductor connected to a negative terminal contact of the battery.

A battery assembly device comprising or consisting of a battery having a positive battery conductor connected to a positive terminal contact of the battery and a negative battery conductor connected to a negative terminal contact of the battery, the battery conductors being soldered to the respective terminal contacts of the battery.

A battery assembly device comprising or consisting of a battery having a positive battery conductor connected to a positive terminal contact of the battery and a negative battery conductor connected to a negative terminal contact of the battery, and a relay connected to one of the battery conductors of the battery.

A battery assembly device comprising or consisting of a battery having a positive battery conductor connected to a positive terminal contact of the battery and a negative battery conductor connected to a negative terminal contact of the battery, and a relay connected to the negative battery conductor.

A battery assembly device comprising or consisting of a battery having a positive battery conductor connected to a positive terminal contact of the battery and a negative battery conductor connected to a negative terminal contact of the battery, and a relay connected to the negative battery conductor.

A battery assembly device comprising or consisting of a battery having a positive battery conductor connected to a positive terminal contact of the battery and a negative battery conductor connected to a negative terminal contact of the battery, and multiple relays connected to the negative battery conductor.

A battery assembly device comprising or consisting of a battery having a positive battery conductor connected to a positive terminal contact of the battery and a negative battery conductor connected to a negative terminal contact of the battery, and a positive cable connected to the positive battery conductor.

DETAILED DESCRIPTION

Figure 1:
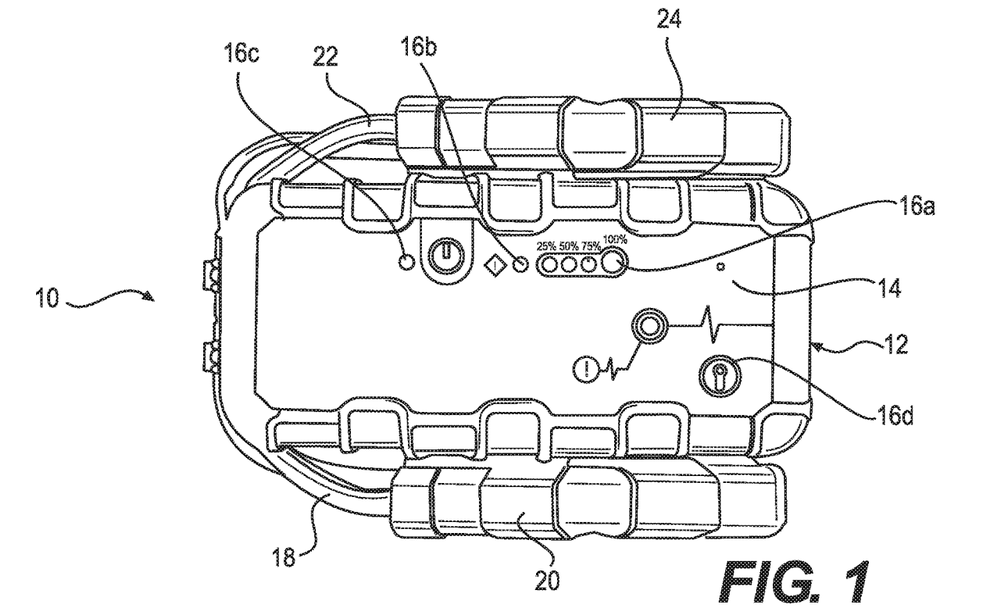
FIG. 1 is a front perspective view of the battery jump starting device with the clamps undeployed.
Figure 2:
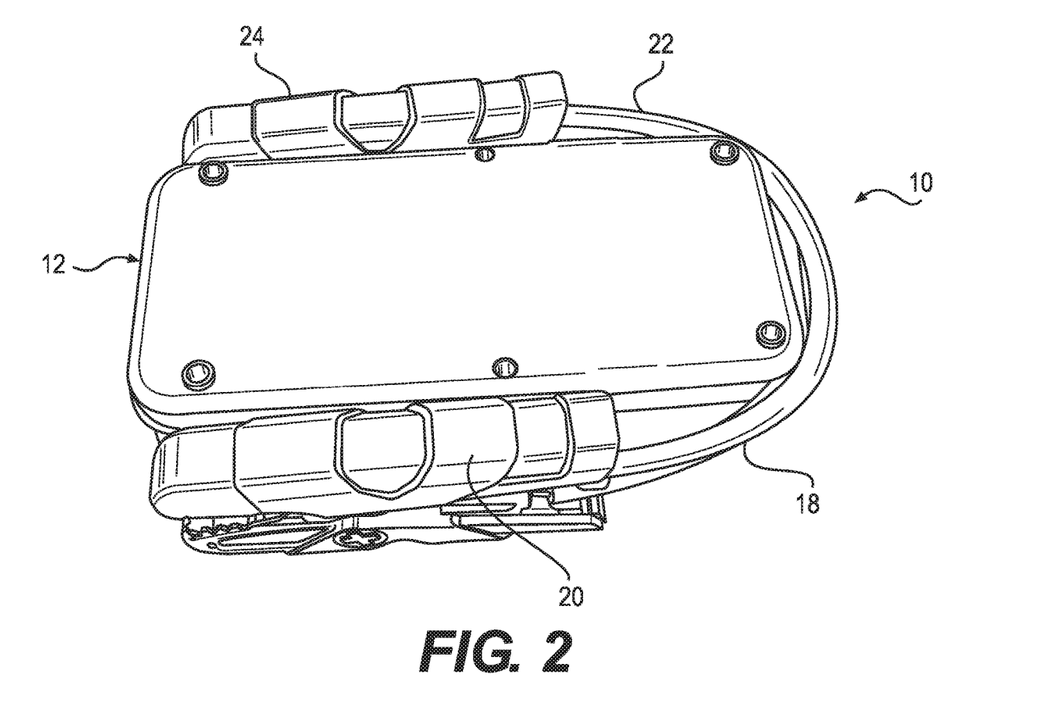
FIG. 2 is a rear perspective view of the battery jump starting device shown in FIG. 1.

A battery jump starter device 10 is shown in FIGS. 1 and 2. The battery jump starting device 10 comprises a casing 12 having a display 14 provided with an arrangement of light emitting diodes 16 (LEDs). The battery jump starting device 10 further comprises a positive cable 18 having a positive clamp 20 and a negative cable 22 having a negative clamp 24. The positive cable 18 and negative cable 22 pass through openings 12a, 12b in the casing 12, and are wired to an internally located component (i.e. battery assembly device) to be described in detail below.

The clamps 20, 24 are stowed away or docked in an undeployed mode by clamping each to a respective side posts 26 extending outwardly on opposite sides of the casing 12, as shown in FIG. 1. The side posts 26 are shown in FIG. 2. The clamps 20, 24 are docked when the battery jump starter device 10 is in non-use, and unclamped from the side post 26 during use.

The battery jump starting device 10 is configured for jump starting a vehicle battery. For example, the battery jump starting device 10 can be the PORTABLE VEHICLE JUMP START APPARATUS WITH SAFETY PROTECTION disclosed in U.S. Pat. No. 9,007,015, which is fully incorporated herein by reference, or an apparatus similar thereto.

The battery jump starting device 10 comprises a variety of electrical components or parts located inside the casing 12. For example, the battery jump starting device 10 comprises the battery assembly 110 shown in FIGS. 5-10 and internal electrical components shown in FIG. 11.

As shown in FIGS. 5-10, the battery assembly 110 comprises a battery 112. For example, the battery 112 is a lithium ion rechargeable type battery. The battery assembly 110 is configured to maximize electrical conductivity from the battery 112 to the cables 18, 22 and clamps 20, 24 of the battery jump starter device 10. The battery 112 comprises a casing, for example, a rectangular-shaped casing 112a.

Figure 5:
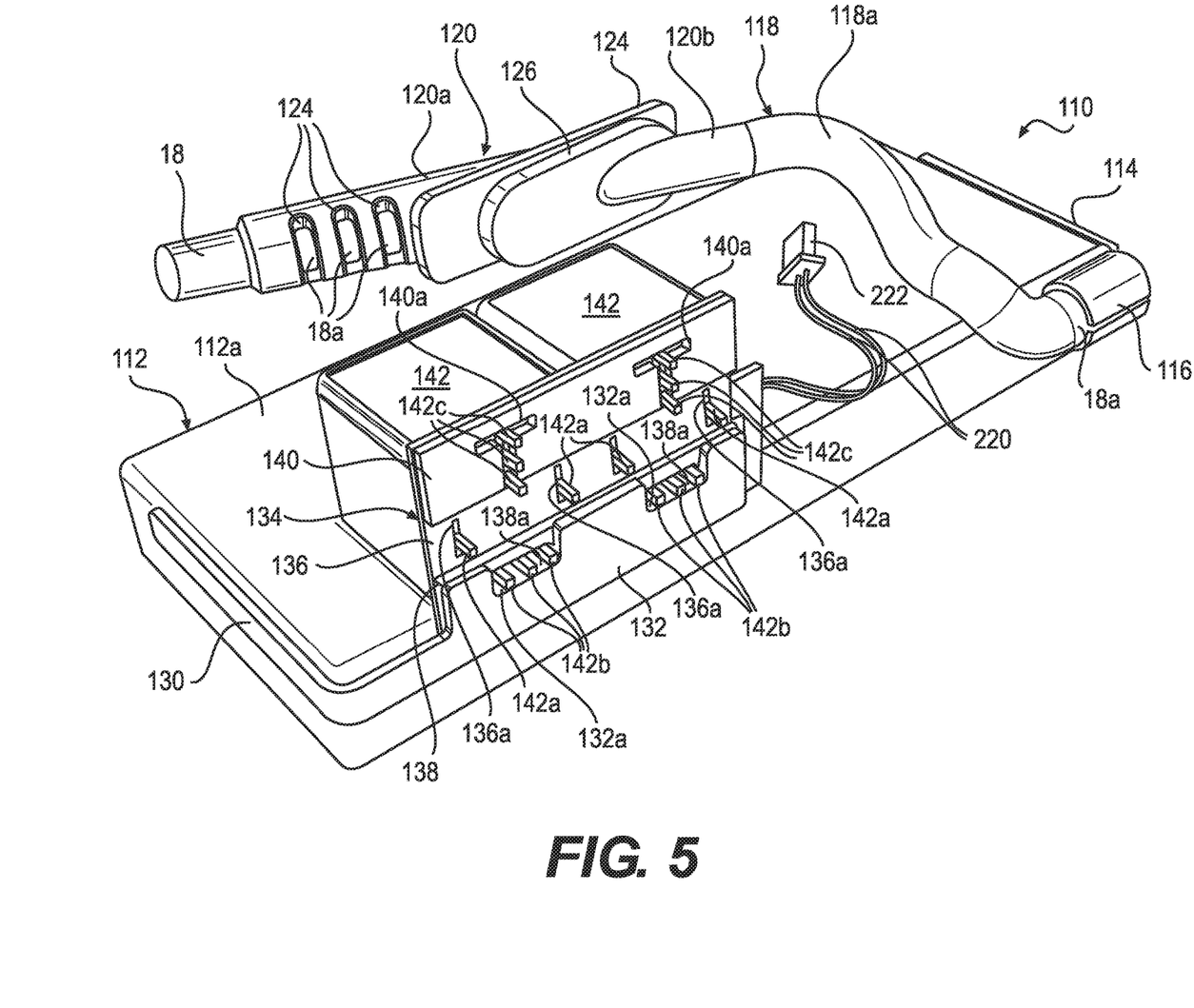
FIG. 5 is a perspective view of a battery assembly device contained within the battery jump starting device shown in FIG. 1 when installed therein, however, with the negative cable not yet installed.
Figure 6:
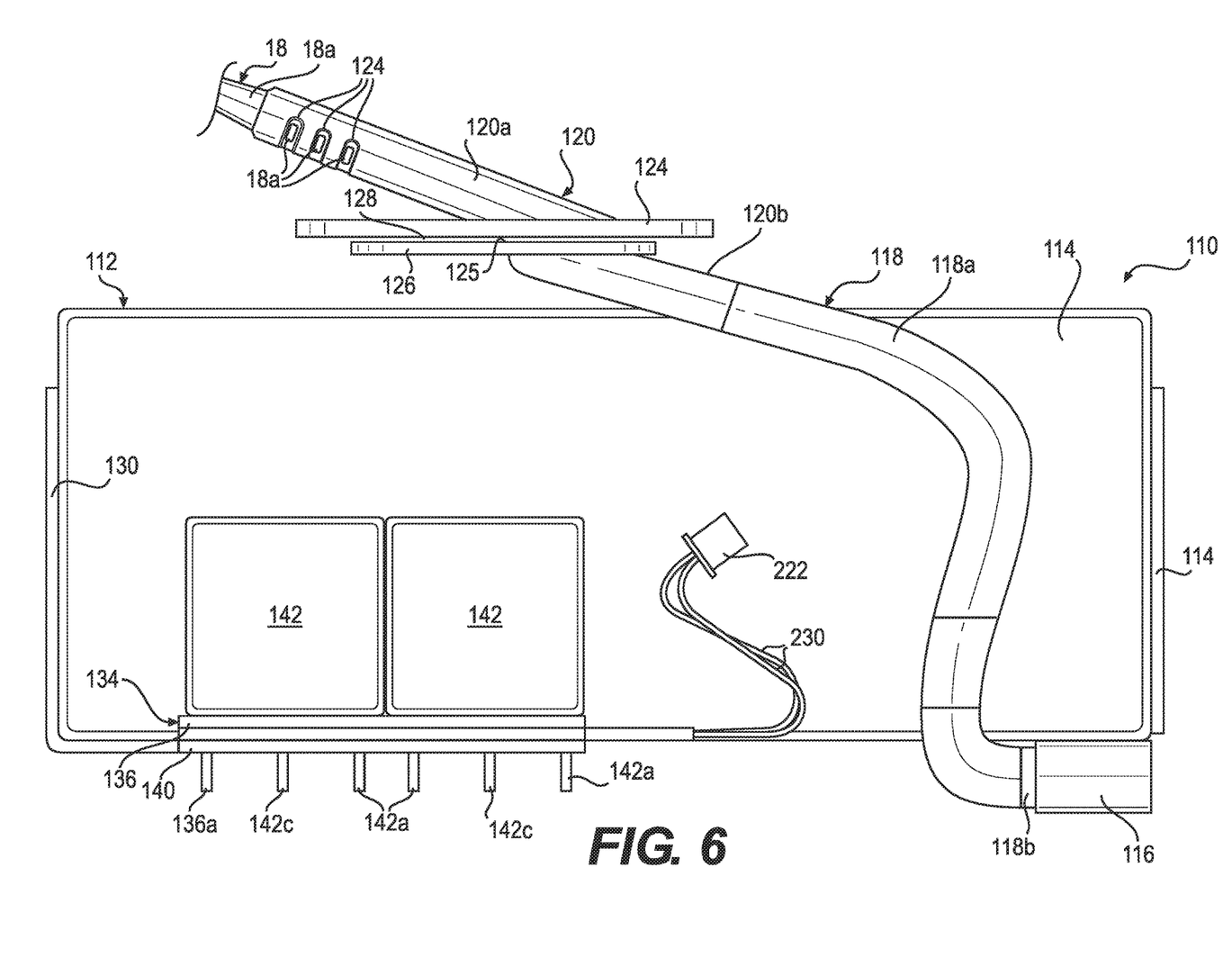
FIG. 6 is a top planer view of the battery assembly device shown in FIG. 5.
Figure 7:
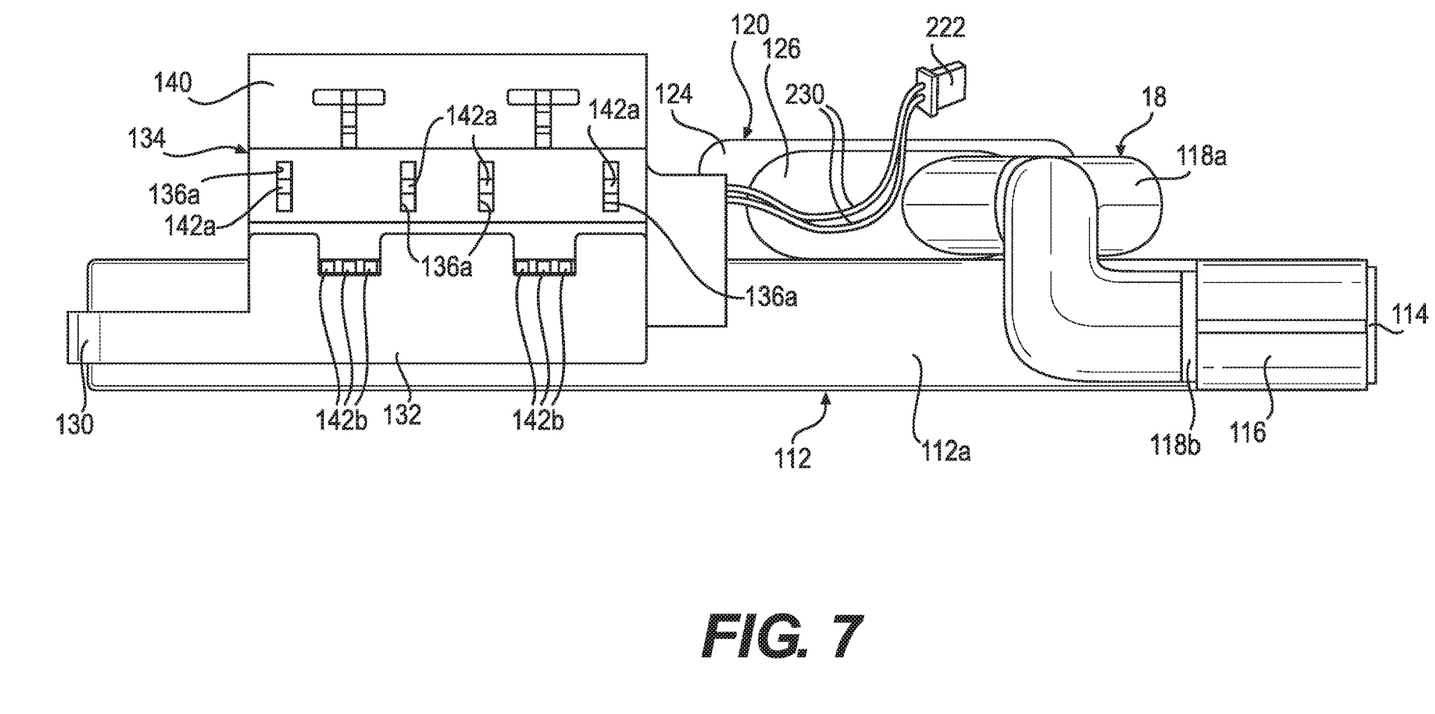
FIG. 7 is a front elevational view of the battery assembly device shown in FIG. 5.
Figure 8:
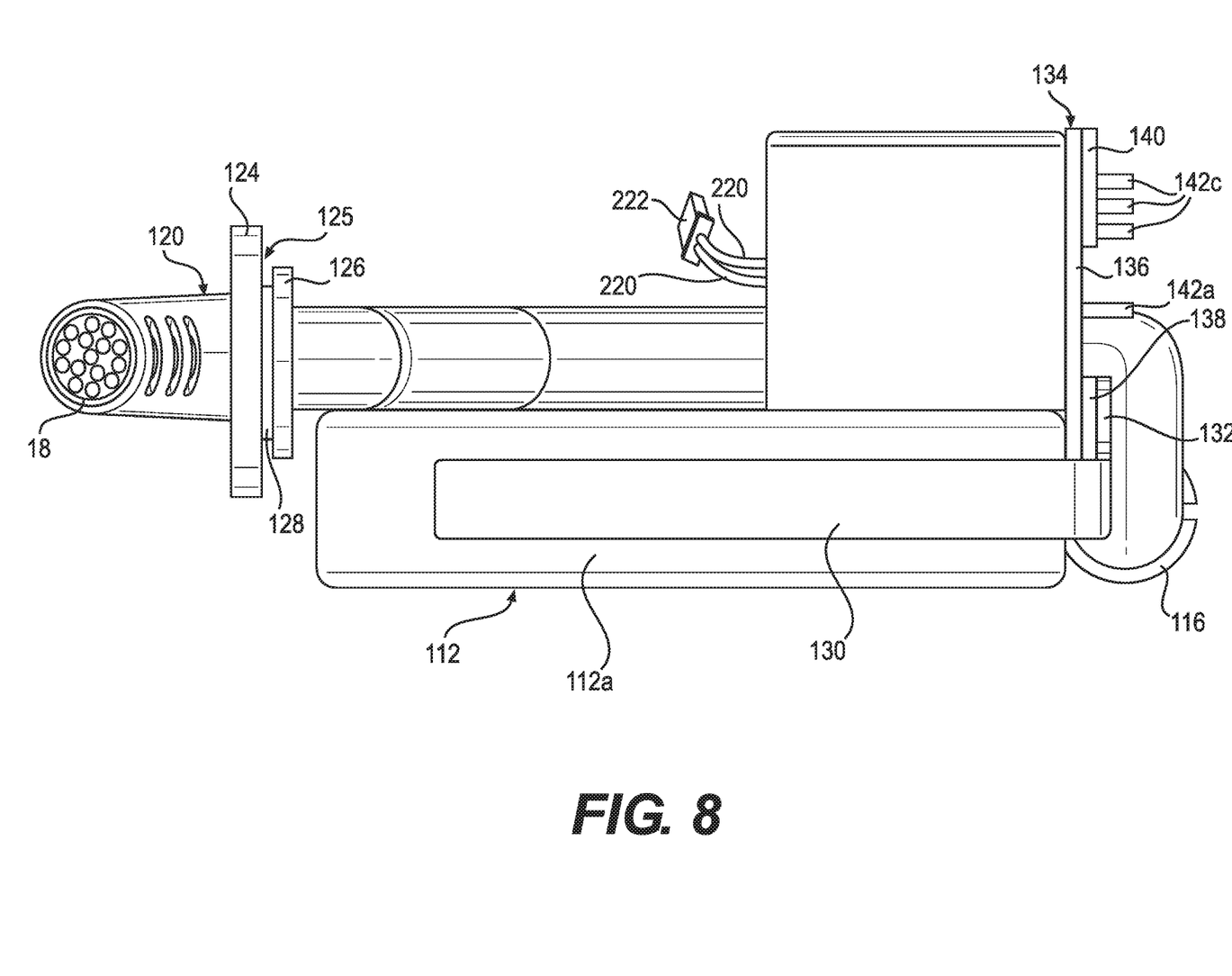
FIG. 8 is a side view of the bent cable connector for the positive cable.

The battery assembly 110 further comprises a positive terminal conductor bar 114 connected (e.g., soldered) at one end to the positive terminal tab (i.e. contact) of the rechargeable battery 112. The other end of the positive terminal conductor bar 114 is provided with a conductive loop 116 wrapping around and connected (e.g. crimped and/or soldered) to an exposed conductor end 18a of a cable conductor for the positive cable 18. The battery assembly 110 also comprises a negative terminal conductor bar 130 connected (e.g. soldered) to the negative terminal tab (i.e. contact) of the rechargeable battery 112. In addition, the width dimension of the terminal conductor bars 114, 130 is aligned with a thickness dimension of the rechargeable battery 112, and the length dimension of the terminal conductor bars 114, 130 is aligned with at least one of the length dimension and width dimension of the rechargeable battery 112, as shown in FIGS. 5-7. The terminal conductor bars 114, 130 have rectangular-shaped cross-sections, as shown in FIGS. 5-7. In addition, as shown in FIGS. 5 and 6, the positive terminal conductor bar 114 comprises a first portion that extends along a width of the lithium ion rechargeable battery pack 112 and a second portion that extends a first distance along a length of the lithium ion rechargeable battery pack 112, and the negative terminal conductor bar 130 comprises a first portion that extends along a width of the lithium ion rechargeable battery pack 112 and a second portion that extends a second distance along the length of the lithium ion rechargeable battery pack 112, wherein the second distance is greater than the first distance.

As shown in FIGS. 5 and 6, the positive terminal conductor bar 114, for example, can be L-shaped so as to wrap around a square-shaped corner of the rectangular-shaped casing 112a of the battery 112 (e.g. when viewing the battery 112 in plan view). The L-shaped positive terminal conductor bar 114 extends along an end of the battery 112 and along at least a portion of the side of the battery 112, as shown in FIG. 6.

The positive terminal conductor bar 114 can also be mechanically coupled and/or adhered to the outer surface of the battery casing 112a to provide additional structural support and stability thereof (e.g. to survive mechanical shock in the event of accidentally dropping battery jump starter device 10). For example, the positive terminal conductor bar 114 can be mechanically connected to the battery casing 112a by adhesive (e.g. silicone adhesive), double sided tape, double sided foam tape, insulating plastic or ceramic connector with snap fit connection and/or mechanical fastener.

The positive cable 18 comprises a bent cable portion 118 connecting the positive cable 18 to the positive terminal conductor bar 114. The bent cable portion 118 comprises an outer sleeve portion 118a transitioning into flexible sleeve 120. The flexible sleeve 120 comprises an outer sleeve portion 120a located externally relative to the casing 112 of the battery jump starter device 10, and a flexible inner sleeve portion 120b located internally relative to the casing 112 of the battery jump starter device 10.

Figure 3:
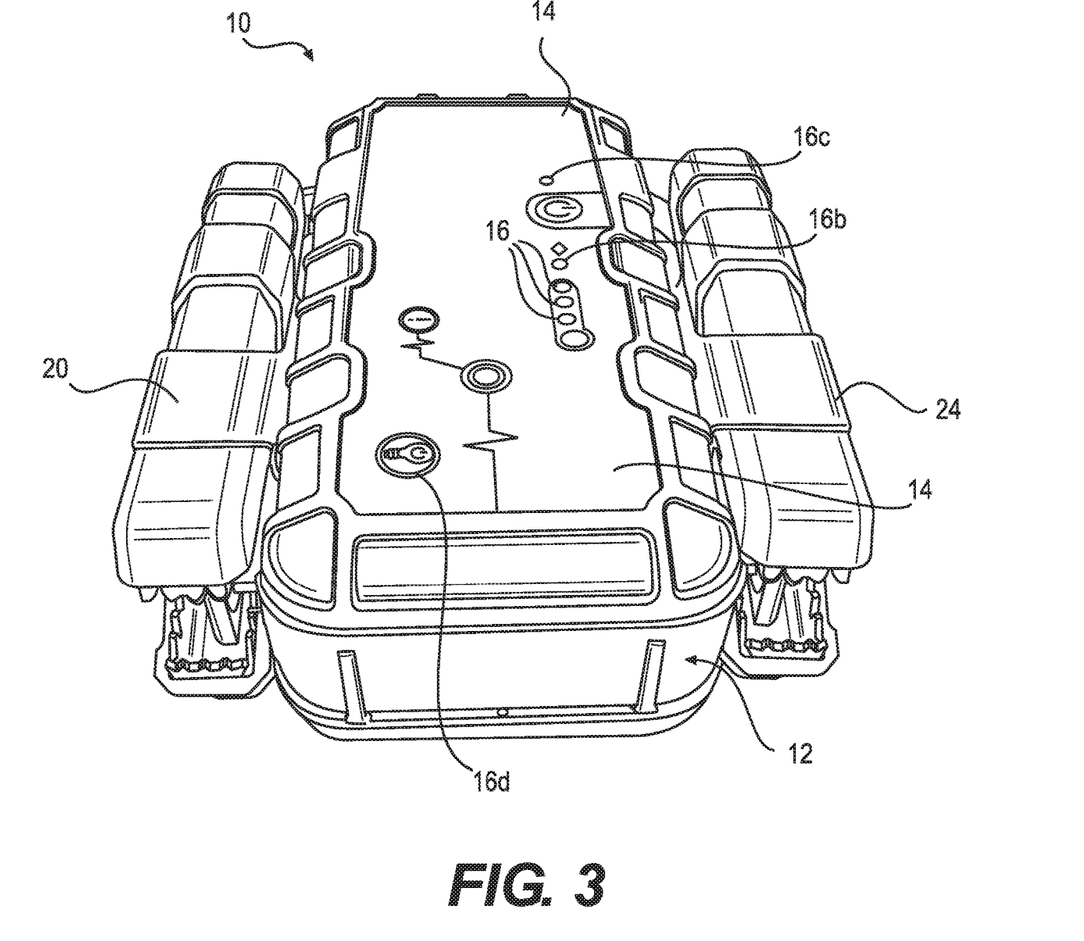
FIG. 3 is an end perspective view of the battery jump starting device shown in FIGS. 1 and 2.
Figure 4:
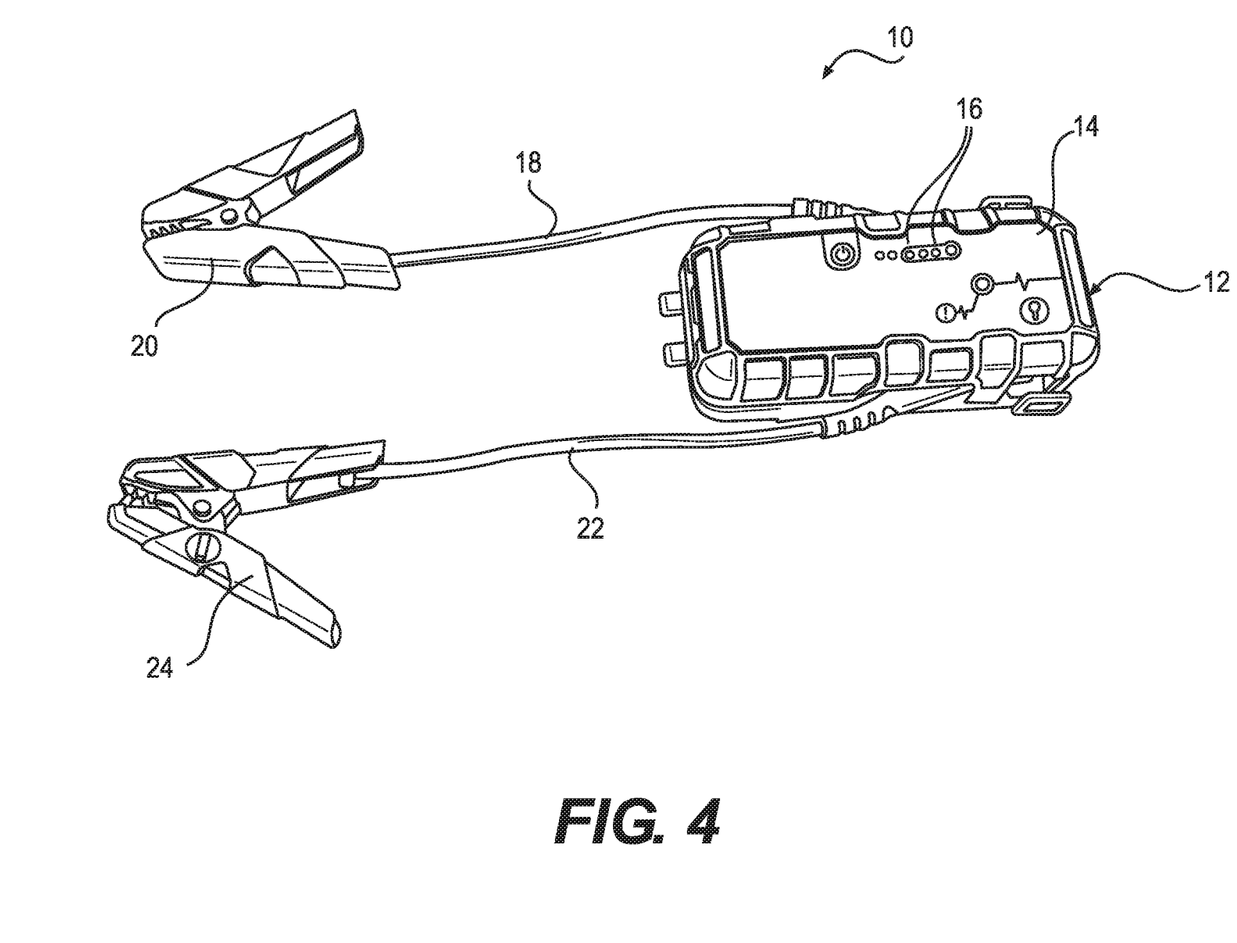
FIG. 4 is a front perspective view of the battery jump starting device shown in FIG. 1, however, with the clamps deployed.

The flexible sleeve 120 is configured to reinforce the connection between the positive cable 18 and the casing 12 of the battery jump starter device 10 while remaining flexible. For example, the flexible sleeve 120 is provided with one or more grooves 124 (three (3) shown in FIG. 3) exposing the outer sleeve 18a of the positive cable 18. The one or more grooves 124 act as hinges to ease bending of the positive cable 18 at the location of the flexible outer sleeve portion 120.

The flexible sleeve 120 further comprises an outer flange 124 spaced apart from an inner flange 126 defining a groove 125 therebetween. For example, the outer flange 124 is spaced apart a distance equal to the wall thickness of the casing 12 from the inner flange 126. The flanges 124, 126 are configured to anchor the flexible connector 120 along with the positive cable 18 to the casing 12 of the battery jump starter device 10. A sleeve portion 128 (FIG. 6) of the flexible connector 120 connects together the outer flange 126 and inner flange 128. For example, the flexible sleeve 120 is molded separately and assembled onto the positive cable 18, or molded onto the positive cable 18 to form a single unit. For example, the flexible outer sleeve portion 120 is insert injection molded with a portion of the positive cable 18 inserted within the mold during the molding process. Alternatively, the flexible outer sleeve portion 120 is made (e.g. molded) separately, and then installed or assembled onto a portion of the positive cable 18. For example, the positive cable 18 comprises an inner conductor (e.g. solid wire conductor or multi-strand metal wire conductor, e.g. made of copper, aluminum) and an outer insulating sleeve 18a (e.g. molded plastic sleeve). The flexible sleeve 120 can be applied (e.g. molded or installed or assembled) onto and surrounding the outer sleeve 18a of the positive cable 18.

The battery assembly 110 further comprises a negative terminal conductor bar 130 connected (e.g. soldered) at one end to the negative terminal tab (i.e. contact) of the battery 112. The other end of the negative terminal conductor bar 130 is provided with a negative terminal conductor bar connector portion 132, as shown in FIG. 5.

The negative terminal conductor bar 130 can be L-shaped to wrap around a corner of the rectangular-shaped battery 112, as shown in FIG. 6. The L-shaped negative terminal conductor bar 130 extends along an end of the battery 112 and along at least a portion of the side of the battery 112.

The negative terminal conductor bar 130 can also be mechanically coupled and/or adhered to the outer surface of the battery casing 112a to provide additional support and stability thereof (e.g. to survive mechanical shock in the event of accidental dropping battery jump starter device 10). For example, the negative terminal conductor bar 114 can be mechanically connected to the battery casing 112a by adhesive (e.g. silicon adhesive), double sided tape, double sided foam tape, insulating plastic or ceramic connector with snap fit connection and/or mechanical fastener.

The battery assembly 110 further comprises a smart switch battery interface 134, as shown in FIG. 5. The smart switch battery interface 134 comprises a circuit board 136 having a first circuit board conductor bar 138 spaced apart from a second circuit board conductor bar 140 both located on one side of the circuit board 136, as shown in FIG. 5.

A pair of relays 142 are mounted on an opposite side of the circuit board 136. The relays 142 include relay anchoring pins 142a extending through the slots 136a in the circuit board 136 (FIG. 5). The relays 142 further include first relay connector pins 142b extending through the slots located in both in the circuit board 136 and through slots 132a in the negative terminal conductor bar connector portion 132. The relays 142 even further include second relay connector pins 142c extending through the slots located in both the circuit board 136, windows 138a of the first circuit board conductor bar 138, and the slots 132a provided in the first conductor bar 138. The relay anchoring pins 136a are soldered in place to mechanically connect the relays 142 to the circuit board 136. The relay connecting pins 142b and 142c are soldered in place to mechanically and electrically connect the relays 142, respectively, to the circuit board conductor plates 138, 140.

The slots 136a in the circuit board 136, for example, are rectangular-shaped (FIG. 5), and accommodate the rectangular-shaped relay anchoring pins 142a. Specifically, a base portion of the relay anchoring pins 142a are rectangular-shaped transitioning to square-shaped ends. The square-shaped ends are dimensionally less wide verses the base portions creating transverse edges oriented flush with the outer surface of the circuit board 136. When solder is applied to the exposed ends of the relay anchoring pins 142a, the solder connects to the sides of the square-shaped ends and transverse edges to anchor and lock the relay anchoring pins 142a to the circuit board 136.

The slots 132a are provided in negative terminal conductor bar connector portion 132, and the slots 138a in the first circuit board conductor bar 138 are rectangular-shaped. The slots 140a in the second circuit board conductor bar 140 (FIG. 5) are T-shaped to accommodate the three (3) horizontally oriented relay connector pins 142b. The ends of the relay connector pins 142b are shown flush with the outer surface of the negative terminal conductor bar connector portion 132. When solder is applied to the exposed ends of the relay connector pins 142b, the solder fills in the slots 132a in the negative terminal conductor bar connector portion 132 and the slots 138a of the first circuit board conductor bar 138, and connects the sides of the connector pins 142b with inner edges of the slots 132a and slots 138a to anchoring the relays 142 to the circuit board 136 and negative terminal conductor bar connector portion 132. This applied solder also electrically connects the negative terminal conductor bar connector portion 132 to the first circuit board conductor bar 138.

Figure 9:
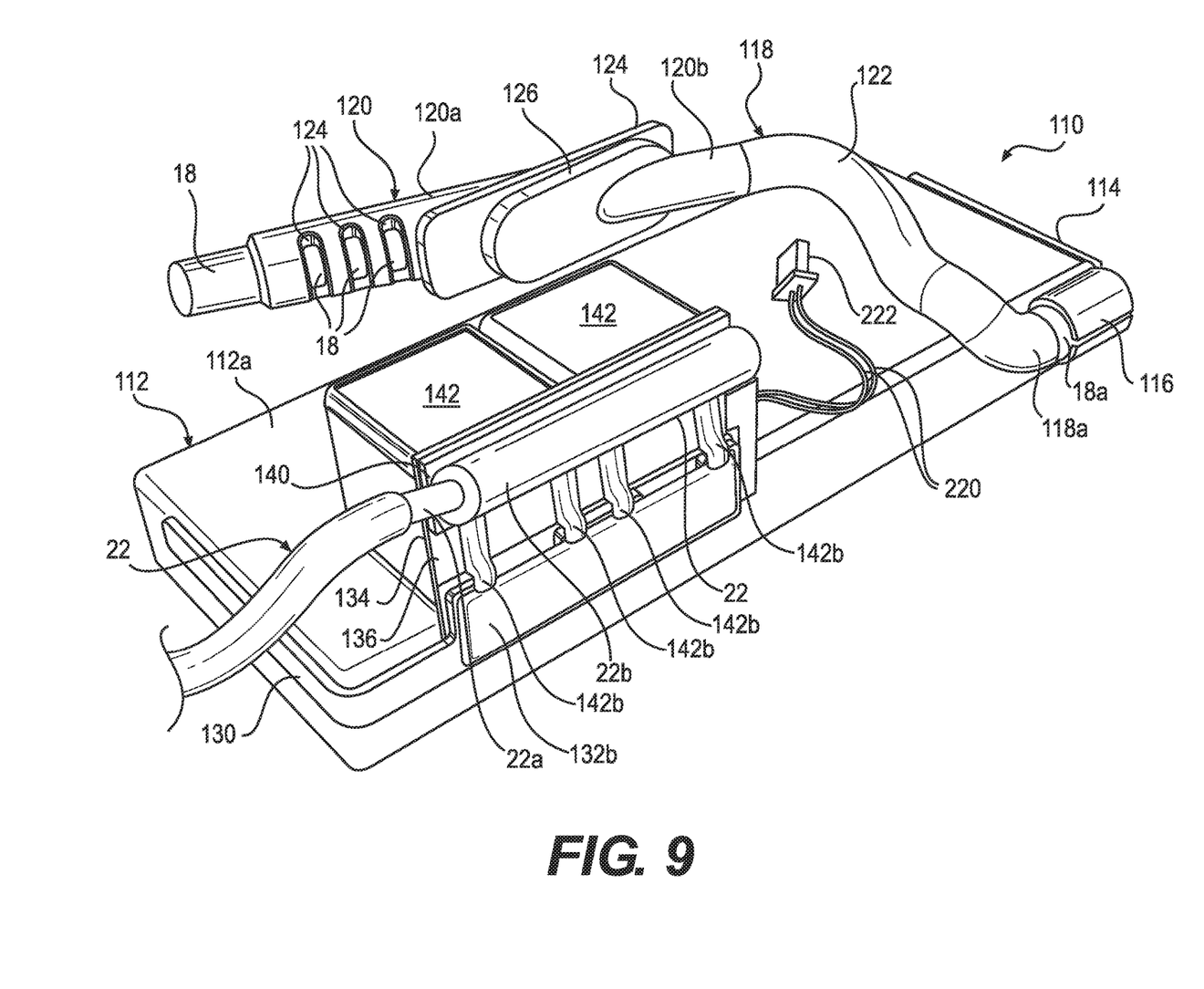
FIG. 9 is a perspective view of the battery assembly device shown in FIG. 5, with the negative cable connected to the battery assembly device.

The slots 140a provided in the second circuit board conductor bar 140 are T-shaped to accommodate the three (3) vertically oriented second relay connecting pins 142c. The second relay connector prongs 142c extend outwardly from the outer surface of the circuit board 136 to connect with the exposed cable end 14a of the negative cable 14, as shown in FIG. 9. When solder is applied to the ends of the second relay connector prongs 142c, the solder fills in the T-shaped slots 140a (FIG. 5) and electrically connects the second relay connector prongs 140c to the second circuit board conductor bar 140. The exposed cable end 22a of the negative cable 22 is soldered to the second relay connector prongs 142c (FIG. 5), as shown in FIG. 9.

The negative terminal conductor bar connector portion 132 of the negative terminal conductor bar 130 is connected (e.g. by soldering) to the first circuit board conductor bar 138 of the circuit board 136. Again, the exposed cable end 22a (i.e. with the insulating sleeve removed) of the negative cable 22 is connected (e.g. by soldering) to the second circuit board conductor bar 140, as shown in FIG. 9. The negative cable 22 is fitted with a flexible sleeve 118, as shown in FIG. 11.

Figure 10:
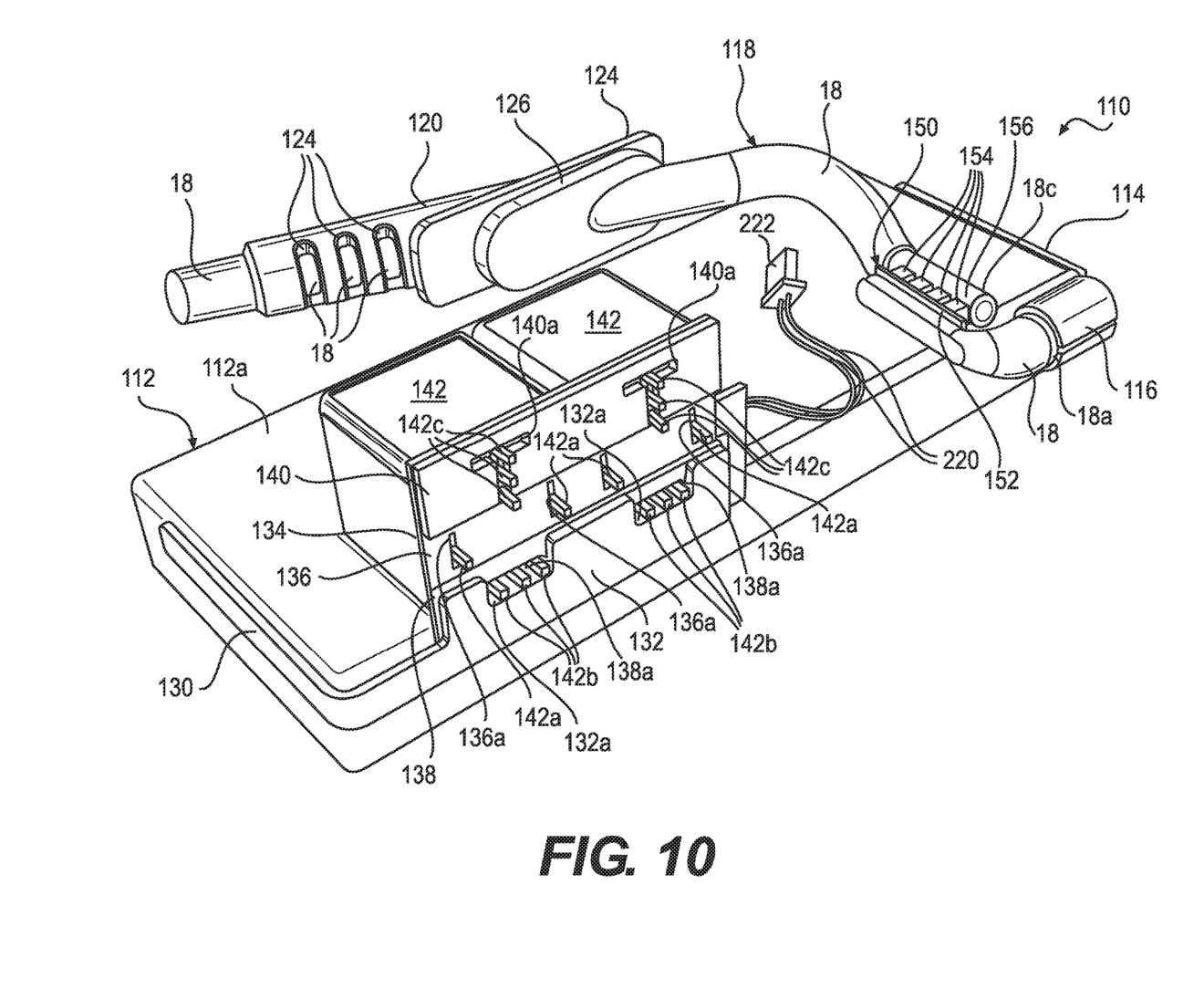
FIG. 10 is a perspective view of the battery assembly device shown in FIG. 5 with a diode device installed on the positive cable.

As an alternative to the arrangement of the bent cable connector 118 (FIG. 5), a diode device 150 is installed onto (i.e. spliced into) the flexible cable connector 118, as shown in FIG. 10. The diode device 150 comprises a circuit board 152 provided with a set of back-charge diodes 154 located on one side thereof, and a conductor bar 156 provided on an opposite side of the circuit board 152.

Assembly

Figure 11:
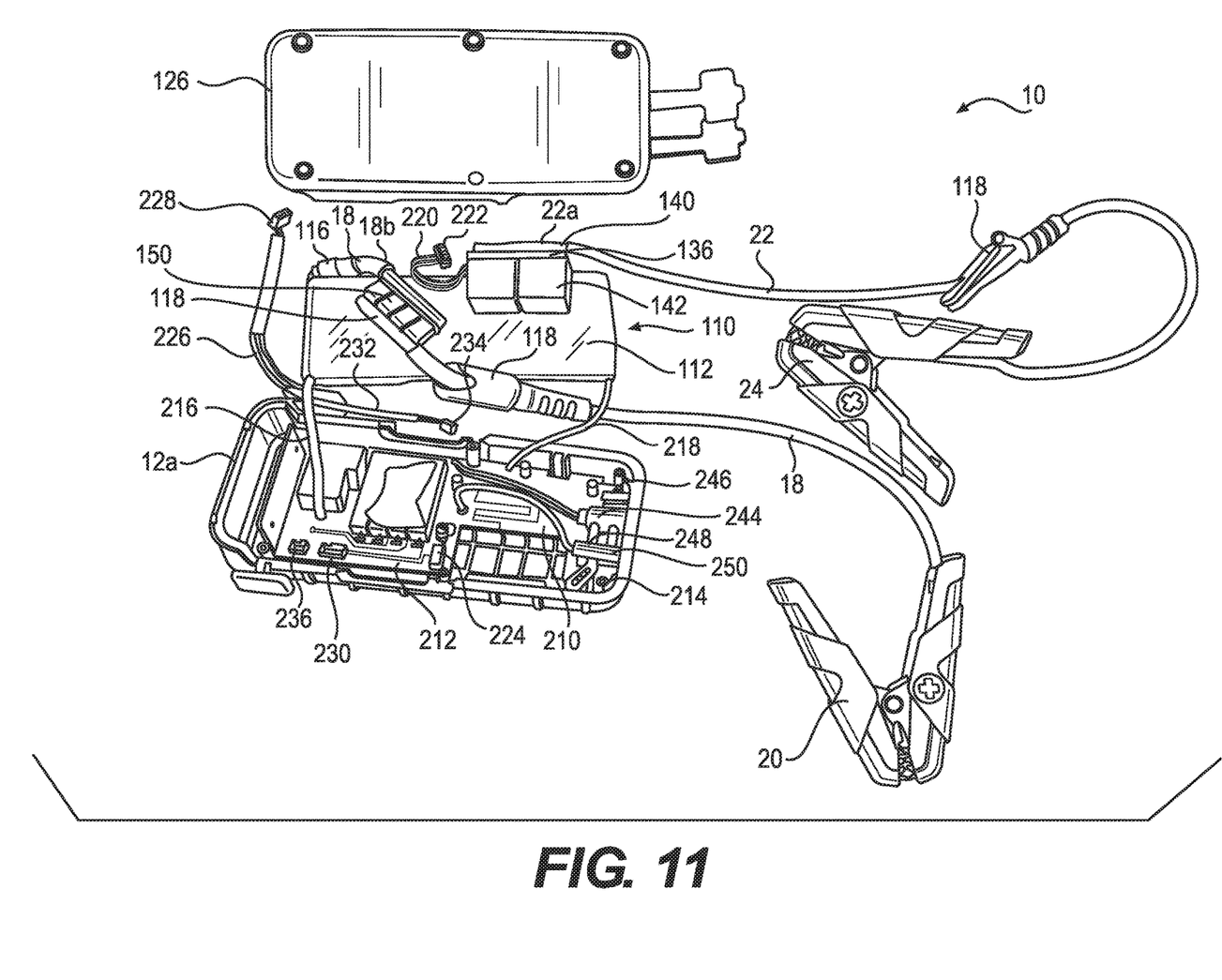
FIG. 11 is a perspective view of the battery assembly device connected to other components or devices of the battery jump starting device.
Figure 12:
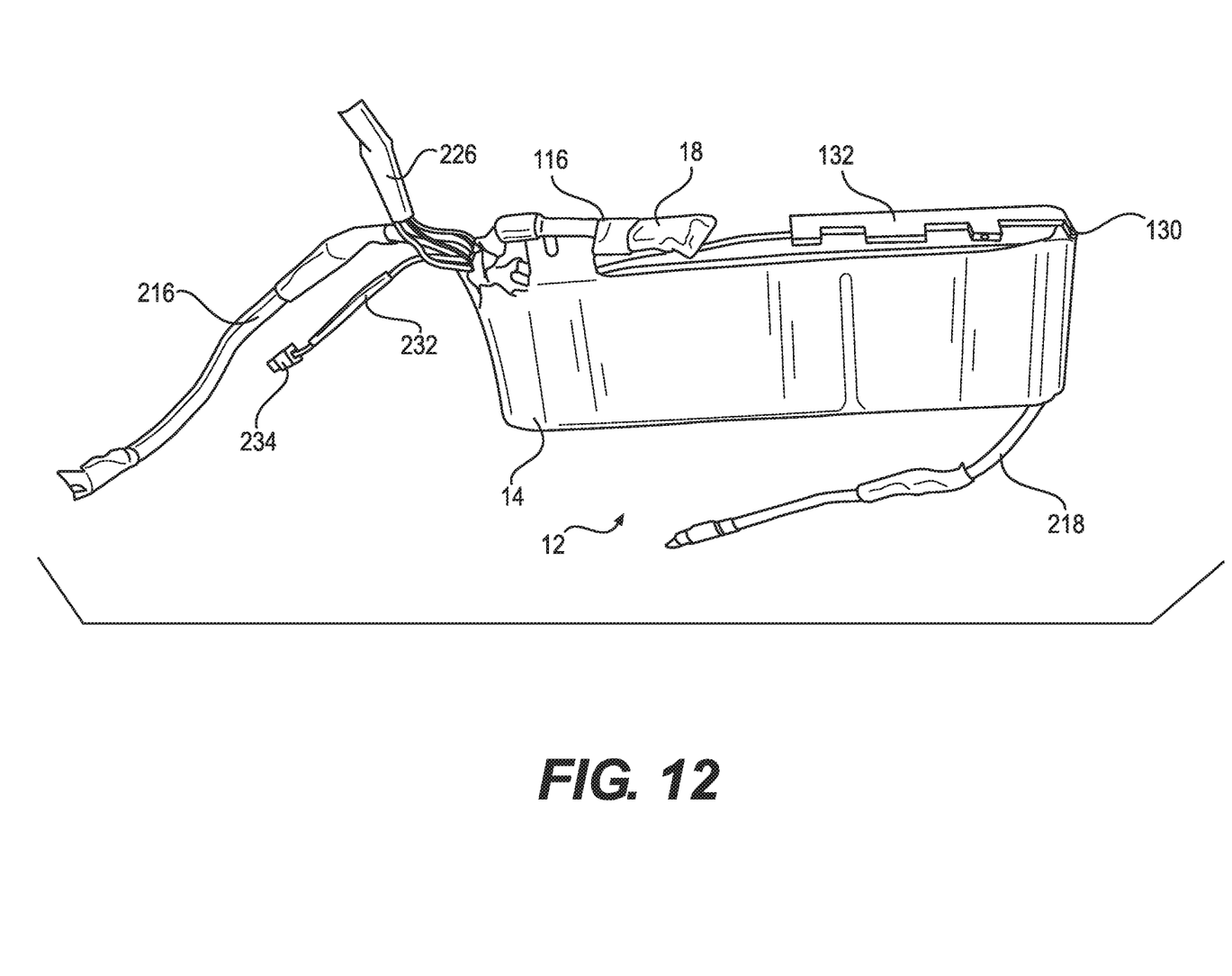
FIG. 12 is a perspective view of the battery pack device contained within the battery jump starting device shown in FIG. 1 when installed therein.

The battery jump starting device 10 comprises the casing 12 having an upper casing portion 12a and a lower casing portion 12b, as shown in FIG. 11. The upper casing portion 12a and the lower casing portion 12b are configured to be connected together when assembling the battery jump starting device 10.

The battery jump starting device 10 further comprises the battery assembly 110 and controller assembly 210 both disposed within the casing 12 when assembling the battery jump starting device 10, as shown in FIG. 11. The controller assembly 210 comprises a circuit board 212 located adjacent to another circuit board 214.

The positive terminal of the battery assembly 110 is connected to the circuit board 212 via a positive power wire 216, as shown in FIG. 11. For example, the positive power wire 216 is soldered to the positive conductor bar 114 (FIG. 5). The negative terminal of the battery assembly 110 is connected to the circuit board 214 via a negative power wire 218.

The relay circuit board 136 is provided with a wire set 220 having a connector 222, as shown in FIG. 11. The connector 222 is configured to connect with the relay board connector 224 located on the circuit board 212 of the controller assembly 210 during assembly of the battery jump starting device 10, as shown in FIG. 11.

The battery assembly 110 further comprises a wire set 226 having a connector 228, as shown in FIG. 11. The connector 228 is configured to connect with the battery cell charging/monitoring connector 230 located on the circuit board 212 of the controller assembly 220.

The battery assembly 110 also comprises a battery temperature sensor having a wire set 232 having a connector 234, as shown in FIG. 11. The connector 234 is configured to connect with the temperature sensor connector 236 located on the circuit board 212 of the controller assembly 220.

The circuit board 212 is provided with in charge power resistors 240 and an out relay 242, as shown in FIG. 11. Further, the lower casing portion 12a is provided with a main user out connector 244 having a wire set 246 connected to the circuit board 214, and a main user in connector 248 having a wire set 250 connected to the circuit board 214.

The battery assembly 110 is connected to battery jump starting device 10, as shown in FIG. 11. The battery connector device 110 is installed within the casing 12 of the battery jump starting device 10 when assembled.

The invention claimed is:
1. A rechargeable battery assembly device for use in a battery jump starting device, the battery jump starting device having a positive battery cable and a negative battery cable, the rechargeable battery assembly device comprising:
   a lithium ion rechargeable battery pack comprising a
      positive terminal tab located on one end of the lithium ion rechargeable battery pack and a negative terminal tab located on an opposite end of the lithium ion rechargeable battery pack;

a positive terminal conductor bar comprising a first portion that extends along a width of the lithium ion rechargeable battery pack, the positive terminal conductor bar soldered or welded to the positive terminal tab of the lithium ion rechargeable battery pack, the first portion of the positive terminal conductor bar having an outer end extending beyond the width of the lithium ion battery pack and electrically connected or connectable to the positive battery cable, the positive terminal conductor bar further comprising a second portion that extends a first distance along a length of the lithium ion rechargeable battery pack; and a negative terminal conductor bar comprising a first portion that extends along a width of the lithium ion rechargeable battery pack, the negative terminal conductor bar soldered or welded to the negative terminal tab of the lithium ion rechargeable battery pack, the first portion of the negative terminal conductor bar having an outer end extending beyond the width of the lithium ion battery pack and electrically connected or connectable to the negative battery cable, the negative terminal conductor bar further comprising a second portion that extends a second distance along the length of the lithium ion rechargeable battery pack, wherein the second distance is greater than the first distance.

2. The rechargeable battery assembly device according to claim 1, wherein both the positive terminal conductor bar and negative terminal conductor bar have rectangular-shaped cross-sections.

3. The rechargeable battery assembly device according to claim 1, wherein the positive terminal conductor bar and the negative terminal conductor bar are oriented parallel relative to each other.

4. The rechargeable battery assembly device according to claim 1, wherein an outer end of the positive terminal conductor bar wraps around an exposed conductor of an end of the positive cable.

5. The rechargeable battery assembly device according to claim 1, wherein the lithium ion rechargeable battery pack is rectangular-shaped, and the positive terminal conductor bar and the negative terminal conductor bar are L-shaped and are bent around respective corners of the lithium ion rechargeable battery pack.

6. The rechargeable battery assembly device according to claim 1, wherein the positive battery cable is connected to the positive terminal conductor bar by a cable portion.

7. The rechargeable battery assembly device according to claim 6, wherein the cable portion comprises a flexible outer sleeve portion and a flexible inner sleeve portion.

8. The rechargeable battery assembly device according to claim 7, wherein the flexible outer sleeve portion comprises an outer flange, and the flexible inner sleeve portion comprises an inner flange, the outer flange and inner flange sandwiching a casing wall of the battery jump starting device.

9. The rechargeable battery assembly device according to claim 6, wherein the cable portion comprises an inner serpentine cable portion.

10. The rechargeable battery assembly device according to claim 9, wherein the cable portion is configured to accommodate the positive battery cable oriented at an angle relative to the casing wall of the battery jump starting device, and the inner serpentine cable portion is configured to accommodate a misalignment between the angle relative to the casing wall and an angle of attachment of the inner serpentine cable portion with the positive terminal conductor bar.

11. The rechargeable battery assembly device according to claim 1, wherein the rechargeable lithium ion rechargeable battery pack comprises a casing.

12. The rechargeable battery assembly device according to claim 1, wherein the positive terminal conductor bar and negative terminal conductor bar are connected in electrical series with the rechargeable lithium ion rechargeable battery pack.

13. The battery jump starting device according to claim 1, further comprising a smart switch connected to and controlling a smart switch interface.

14. The battery jump starting device according to claim 13, wherein the smart switch interface comprises a circuit board having a first circuit board conductor bar spaced apart from a second circuit board conductor bar.

15. The battery jump starting device according to claim 14, wherein the negative terminal conductor bar is connected to the first circuit board conductor bar.

16. A rechargeable battery assembly device for use in a battery jump starting device, the battery jump starting device having a positive battery cable and a negative battery cable, the rechargeable battery assembly device comprising:

a rectangular-shaped lithium ion rechargeable battery pack comprising a positive terminal tab located on one end of the rectangular-shaped lithium ion rechargeable battery pack and a negative terminal tab located on an opposite end of the rectangular-shaped lithium ion rechargeable battery pack;

a positive terminal conductor bar comprising a first portion that extends along a width of the lithium ion rechargeable battery pack, the positive terminal conductor bar soldered or welded to the positive terminal tab of the rectangular-shaped lithium ion rechargeable battery pack, the first portion of the positive terminal conductor bar having an outer end located at a side of the lithium ion battery pack and extending beyond the width of the lithium ion battery pack and electrically connected or connectable to the positive battery cable, the positive terminal conductor bar further comprising a second portion that extends a first distance along a length of the rectangular-shaped lithium ion rechargeable battery pack; and a negative terminal conductor bar located on the opposite end and comprising a first portion that extends along the width of the lithium ion rechargeable battery pack, the negative terminal conductor bar having one end soldered or welded to the negative terminal tab of the rectangular-shaped lithium ion rechargeable battery pack, the first portion of the negative terminal conductor bar having an outer end located at the side of the lithium ion battery pack and extending beyond the width of the lithium ion battery pack and electrically connected or connectable to the negative battery cable, the negative terminal conductor bar further comprising a second portion that extends a second distance along the length of the rectangular-shaped lithium ion rechargeable battery pack, wherein the second distance is greater than the first distance.

17. The battery jump starting device according to claim 16, further comprising a smart switch connected to and controlling a smart switch interface.

18. The battery jump starting device according to claim 17, wherein the smart switch interface comprises a circuit board having a first circuit board conductor bar spaced apart from a second circuit board conductor bar.

19. The battery jump starting device according to claim 18, wherein the negative terminal conductor bar is connected to the first circuit board conductor bar.

20. A rechargeable battery assembly device for use in a battery jump starting device, the battery jump starting device having a positive battery cable and a negative battery cable, the rechargeable battery assembly device comprising:
a rectangular-shaped lithium ion rechargeable battery pack comprising a positive terminal tab located on one end of the rectangular-shaped lithium ion rechargeable battery pack and a negative terminal tab located on an opposite end of the rectangular-shaped lithium ion rechargeable battery pack;
an L-shaped positive terminal conductor bar located on the one end and comprising a first portion that extends along a width of the rectangular-shaped lithium ion rechargeable battery pack, the L-shaped positive terminal conductor bar connected to the positive terminal of the rectangular-shaped lithium ion rechargeable battery pack, the first portion of the L-shaped positive terminal conductor bar having an outer end extending beyond the width of the lithium ion battery pack and along a side of the lithium ion battery pack, the outer end of the L-shaped positive terminal conductor bar electrically connected or connectable to the positive battery cable, the L-shaped positive terminal conductor bar further comprising a second portion that is bent around a corner of the rectangular-shaped lithium ion rechargeable battery pack and a third portion that extends a first distance along a length of the rectangular-shaped lithium ion rechargeable battery pack; and
an L-shaped negative terminal conductor bar comprising a first portion that extends along the width of the rectangular-shaped lithium ion rechargeable battery pack, the first portion of the L-shaped negative terminal conductor bar having one end connected to the negative terminal tab of the rectangular-shaped lithium ion rechargeable battery pack, the L-shaped negative terminal conductor bar having an outer end extending beyond the width of the rectangular-shaped lithium ion battery pack and along an opposite side of the rectangular-shaped lithium ion battery pack, the outer end of the L-shaped negative terminal conductor bar electrically connected to or connectable to the negative battery cable, the L-shaped negative terminal conductor bar further comprising a second portion that is bent around a corner of the rectangular-shaped rechargeable battery pack and a third portion that extends a second distance along the length of the rectangular-shaped lithium ion rechargeable battery pack, wherein the second distance is greater than the first distance.

21. The battery jump starting device according to claim 20, further comprising a smart switch connected to and controlling a smart switch interface.

22. The battery jump starting device according to claim 21, wherein the smart switch interface comprises a circuit board having a first circuit board conductor bar spaced apart from a second circuit board conductor bar.

23. The battery jump starting device according to claim 22, wherein the negative terminal conductor bar is connected to the first circuit board conductor bar.

24. A battery jump starting device having a positive battery cable and a negative battery cable, the device comprising:
a lithium ion rechargeable battery pack comprising a positive terminal and a negative terminal;
a positive terminal conductor bar, the positive terminal conductor bar having one end connected to the positive terminal of the rechargeable lithium ion rechargeable battery and an opposite end spaced apart from the one end and electrically connected or connectable to the positive battery cable, the positive terminal conductor bar having at least a portion of the length of the positive terminal conductor bar located at an end of the lithium ion rechargeable battery pack, the positive terminal conductor bar extending a first distance along a length of the lithium ion rechargeable battery pack;
a negative terminal conductor bar, the negative terminal conductor bar having one end connected to the negative terminal of the rechargeable lithium ion rechargeable battery pack and an opposite end spaced apart from the one end and electrically connected or connectable to the negative battery cable, the negative terminal conductor bar having at least a portion of the length of the negative terminal conductor bar located at an another end of the lithium ion rechargeable battery, the negative terminal conductor bar extending a second distance along the length of the lithium ion rechargeable battery pack, wherein the second distance is greater than the first distance;
a smart switch controller; and
a smart switch interface connected to and controlled by the smart switch controller, the smart switch interface comprising a circuit board having a first circuit board conductor bar connected to an opposite end of the negative terminal conductor bar of the lithium ion rechargeable battery pack and a second circuit board conductor bar spaced apart from the first circuit board conductor bar on the circuit board and connected to the negative battery cable, the smart switch interface further comprising one or more relays connected between the first circuit board conductor bar and the second circuit board conductor bar for providing isolation between the negative terminal of the lithium ion rechargeable battery pack and a battery being jump started by the battery jump starting device.

25. The battery jump starting device according to claim 24, wherein the one or more relays is multiple relays connected in parallel between the first circuit board conductor bar and the second circuit board conductor bar.

26. The battery jump starting device according to claim 24, wherein both the positive terminal conductor bar and negative terminal conductor bar have rectangular-shaped cross-sections.

27. The battery jump starting device according to claim 24, wherein the length of the positive terminal conductor bar and the length of the negative terminal conductor bar are oriented parallel relative to each other.

28. The battery jump starting device according to claim 24, wherein an outer end of the positive terminal conductor bar wraps around an exposed conductor of an end of the positive cable.

29. The battery jump starting device according to claim 24, wherein the positive terminal conductor bar is soldered and/or welded to the positive terminal of the lithium ion rechargeable battery pack and the negative terminal conductor bar is soldered and/or welded to the negative terminal of the lithium ion rechargeable battery pack.

30. The battery jump starting device according to claim 24, wherein the lithium ion rechargeable battery pack is rectangular-shaped, and the positive terminal conductor bar and the negative terminal conductor bar are L-shaped and are bent around respective corners of the lithium ion rechargeable battery pack.

31. The battery jump starting device according to claim 30, wherein the positive terminal conductor bar and negative terminal conductor bar are mounted to opposite ends of the rechargeable lithium ion rechargeable battery pack.

32. A battery assembly for a jump starting device having a positive battery cable and a negative battery cable, the battery assembly comprising:
   a lithium ion rechargeable battery pack comprising a positive terminal and a negative terminal, the positive terminal being electrically connected or connectable to the positive battery cable;
   a positive terminal conductor bar connected to the positive terminal of the lithium ion rechargeable battery pack, and connected or connectable to the positive battery cable, wherein the positive terminal conductor bar comprises a portion that extends a first distance along a length of the lithium ion rechargeable battery pack;
   a negative terminal conductor bar, the negative terminal conductor bar connected to the negative terminal of the lithium ion rechargeable battery pack, and connected or connectable to the negative battery cable, wherein the negative terminal conductor bar comprises a portion that extends a second distance along the length of the lithium ion rechargeable battery pack, the second distance being greater than the first distance;
   a smart switch controller; and
   a smart switch interface connected to and controlled by the smart switch controller, the smart switch interface comprising a circuit board having a first circuit board conductor bar connected to an opposite end of the negative terminal conductor bar of the lithium ion rechargeable battery pack and a second circuit board conductor bar spaced apart from the first circuit board conductor bar on the circuit board and connected to the negative battery cable, the smart switch interface further comprising one or more relays connected between the first circuit board conductor bar and the second circuit board conductor bar for providing isolation between the negative terminal of the lithium ion rechargeable battery pack and a battery being jump started by the battery jump starting device.

* * * * *